United States Patent
Davenport (10) Patent No.: US 6,690,111 B1
(45) Date of Patent: Feb. 10, 2004

(54) LAMP WITH ANODE SUPPORT STRUCTURE AND ANODE SURFACE CONFIGURATION HAVING IMPROVED HEAT DISSIPATION PROPERTIES

(75) Inventor: Eric P. Davenport, Van Etten, NY (US)

(73) Assignee: Imaging & Sensing Technology Corporation, Horseheads, NY (US)

( * ) Notice: Subject to any disclaimer, the term of this patent is extended or adjusted under 35 U.S.C. 154(b) by 0 days.

(21) Appl. No.: 09/333,378

(22) Filed: Jun. 15, 1999

(51) Int. Cl.[7] .......................... H01J 17/02; H01J 61/02
(52) U.S. Cl. ........................................ 313/613; 313/40
(58) Field of Search .......................... 313/39, 40, 41, 313/609, 610, 613, 45

(56) References Cited

U.S. PATENT DOCUMENTS

| 4,366,408 A | * 12/1982 | Cooper et al. ............ 313/39 |
| 4,441,048 A | 4/1984 | Takaoka et al. |
| 4,611,143 A | 9/1986 | Shimazu et al. |
| 5,047,689 A | 9/1991 | Kawai et al. |
| 5,057,742 A | 10/1991 | Kawai et al. |
| 5,159,236 A | 10/1992 | Kawai |
| 5,191,260 A | 3/1993 | Kawai et al. |
| 5,552,669 A | 9/1996 | Ikedo et al. |
| 5,587,625 A | 12/1996 | Ikedo et al. |
| 5,619,101 A | 4/1997 | Ikedo et al. |
| 5,633,563 A | 5/1997 | Ikedo et al. |
| 5,646,487 A | 7/1997 | Ikedo et al. |
| 5,684,363 A | * 11/1997 | Ikedo et al. ............ 313/613 |
| 5,698,945 A | * 12/1997 | Ikedo et al. ............ 313/613 |
| 5,706,821 A | 1/1998 | Matcher et al. |
| 5,721,465 A | * 2/1998 | Roberts ............ 313/46 |
| 5,836,351 A | 11/1998 | Underwood, III |
| 6,078,132 A | * 6/2000 | Davenport ............ 313/238 |

* cited by examiner

Primary Examiner—Nimeshkumar D. Patel
Assistant Examiner—Glenn Zimmerman
(74) Attorney, Agent, or Firm—Nixon Peabody LLP (57) ABSTRACT

An improved deuterium lamp (20) includes a gas-filled envelope (21), a cathode (22), an anode (23), electrical leads (24) sealingly penetrating the glass envelope and connected to the anode and cathode, respectively, a window-shielding electrode (25), a cathode-shielding electrode (26), a focusing electrode (28), and a ceramic support (29). The improvement comprises the anode being mounted on a rear surface of the ceramic support and being so configured and arranged as to have nothing that substantially interferes with the radiation of heat in rearward direction from the anode.

20 Claims, 7 Drawing Sheets

LAMP WITH ANODE SUPPORT STRUCTURE AND ANODE SURFACE CONFIGURATION HAVING IMPROVED HEAT DISSIPATION PROPERTIES

TECHNICAL FIELD

The present invention relates generally to the field of gas discharge tubes, and, more particularly, to a long-life deuterium lamp having enhanced heat dissipation capabilities.

BACKGROUND ART

Deuterium is a hydrogen isotope of mass 2, and is commonly identified by the symbol D. Deuterium occurs in nature as a diatomic molecule, and in compounds.

Deuterium arc lamps are well-known sources of light in the range of 190–400 nanometers. They are commonly used in various spectral analyzers, such as absorption detectors, spectral photometers, spectral scopes, and the like.

In general, deuterium lamps have an anode and a cathode arranged within an elongated tubular envelope made of a UV-transmitting glass or quartz. A focusing electrode is placed between the anode and the cathode. Deuterium gas is dosed into the envelope at a pressure of a few torr. In many cases, mechanical structure (e.g., anode, focusing electrode, and the like) is supported within the glass envelope on the distal ends(s) of one or more electrical conductors. Each conductor is generally in the form of a rod-like member having a large length-to-diameter ratio, and normally possesses sufficient strength to prevent or restrain axial movement of the mechanical structure within the envelope.

When a sufficient voltage is applied to the electrodes, a stream of electrons flow from the cathode to the anode. The electrons collide with the deuterium gas molecules and excite them to higher energy levels. When the molecules return to their ground state, energy is released in the form of photons in the UV range. The focusing electrode serves to constrict and intensify the discharge of the lamp to a diameter of one millimeter or smaller. The concentration of light by the focusing electrode makes it useful in the application of absorption detectors and similar instruments.

Details of prior art deuterium lamps are representatively shown in a catalog entitled "Deuterium Lamps and Power Supplies for UV Analytical instruments", Imaging and Sensing Technology Corporation, Horseheads, N.Y. (undated), and in U.S. Pat. Nos. 4,433,265, 4,910,431 and 5,117,150. These references all appear to disclose different types of prior art deuterium lamps in which certain mechanical structure is cantilever-mounted on the distal end(s) of one or more electrical conductors. The aggregate disclosures of these various prior art references are hereby incorporated by reference.

Additional details of other known deuterium lamps are shown and described in U.S. Pat. Nos. 5,552,669, 5,684,363, 5,619,101, 5,633,563 and 5,698,945. Each of these patents is facially assigned to Hamamatsu Photonics K. K. However, one problem attendant such prior art designs is believed to stem from the relatively short life of the lamp. This problem is believed to originate in the difficulty in dissipating heat from the anode. In this regard, the '669 patent appears to disclose an anode sandwiched between a discharge shielding plate and a support plate. Hence, it appears that it is difficult for heat to dissipate from the anode. The '101 patent also shows the anode as being surrounded by an solid anode support member that tends to impede heat removal. The same is true of the '563 patent. The '363 patent appears to disclose an anode support plate to the rear of the anode. This anode support plate would itself impede heat transfer from the anode. Here again, the aggregate disclosures of these patents are hereby incorporated by reference with respect to the structure and operation of such prior art deuterium lamps and various physical implementations of same.

Accordingly, it would be generally desirable to provide an improved long-life deuterium lamp having enhanced heat transfer properties. It is thought that by facilitating the conveyance of heat away from the anode, the operational life of the lamp may be increased.

Generally, the life of a deuterium lamp is determined by its intensity. The lamp begins with an original intensity that degrades over time. When the intensity falls below 50% of its initial value, it is said to have reached the end of its useful life. This is an industry standard that is recognized by most manufacturers of deuterium lamps, even though the lamp may technically still retain some utility after its intensity has fallen below 50% of its initial value.

DISCLOSURE OF THE INVENTION

With parenthetical reference to the corresponding structure, portions or surfaces of the disclosed embodiment, merely for purposes of illustration and not by way of limitation, the present invention provides an improved long-life lamp having enhanced heat transfer characteristics.

In one form, the improved lamp (20) has a gas-filled glass envelope (21); a cathode (22); an anode (23); electrical leads (24) sealingly penetrating the envelope and connected to the anode and cathode, respectively; a window-shielding electrode (25); a cathode-shielding electrode (26); a focusing electrode (28); and a ceramic support (29). In this form, the improvement broadly comprises the ceramic support having a front surface (66) facing toward the cathode, having a rear surface (68) facing away from the cathode, and wherein the anode is held against the support rear surface without substantially interfering with the radiation of heat therefrom in a rearward direction.

The anode may be held against the support by at least one fastener, such as a rivet, a bolt, a screw, or the like. The ceramic support may possibly be provided with a tapped hole to receive the threaded marginal end portion of such fastener. A ceramic shield may extend rearwardly from the rear surface of the ceramic support so as to surround the anode and to prevent arcing from the anode to the cathode. The anode is recessed within this peripheral shield, but is exposed rearwardly. The envelope may be filled with deuterium gas. The envelope may be formed of a UV-transmissive material.

The improvement may further comprise means for increasing the surface area of the anode on the rear thereof, to enhance thermal radiation therefrom. These means may include, but are not limited to, a plurality of fins, a radiator surface having an undulating cross-section, and/or a baffle so as to shape and direct the flow of gas within the envelope.

Accordingly, the general object of the invention is to provide an improved deuterium lamp.

Another object is to provide a deuterium lamp having improved heat-radiation characteristics from the rear of the anode.

Still another object is to provide a longer-life deuterium lamp.

These and another objects and advantages will become apparent from the foregoing and ongoing written specification, the drawings and the appended claims.

DESCRIPTION OF THE PREFERRED EMBODIMENTS

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly to FIGS. 1–4 thereof, the present invention broadly provides an improved deuterium lamp, of which a presently-preferred embodiment is generally indicated at 20. Lamp 20 is shown as broadly including a vertically-elongated gas-filled glass envelope 21; a cathode 22 (FIG. 3); an anode 23 (FIG. 3); a plurality of leads, severally indicated at 24 and individually identified by the suffix A, B, C, etc., sealingly penetrating the lowermost stem of envelope and connected to the anode and/or cathode, respectively (FIGS. 1–2); a window-shielding electrode, generally indicated at 25; a cathode-shielding electrode 26; a focusing electrode 28; and a ceramic support 29. The improved lamp is filled with deuterium gas. A plurality of vertically-elongated tubular insulators, severally indicated at 30, surround the various leads and electrically insulate one from another, as well as provide a means for physically supporting the mechanical structure at the upper ends of such leads.

Figure 1:
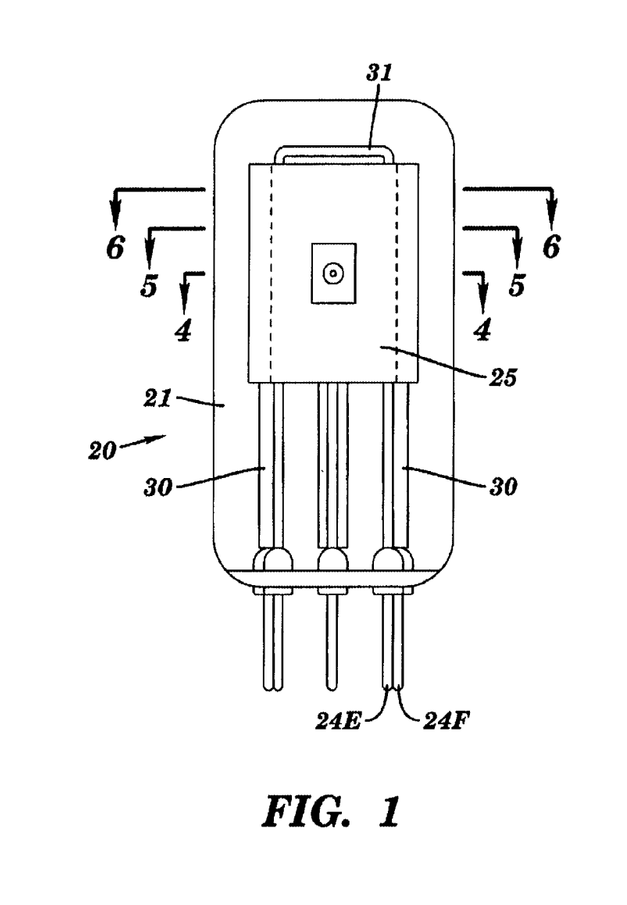
FIG. 1 is a fragmentary front elevation of an improved deuterium lamp according to the present invention.
Figure 2:
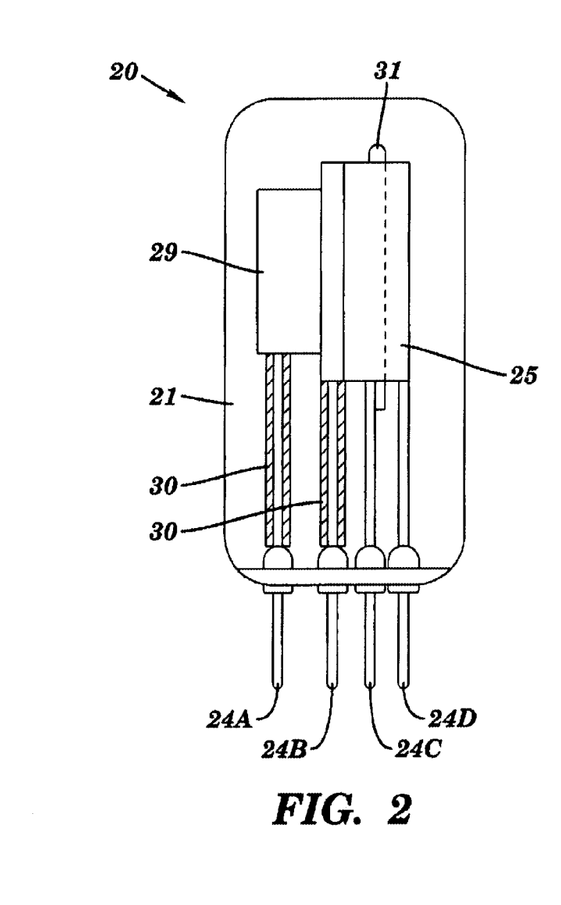
FIG. 2 is a left side elevation of the lamp shown in FIG. 1.
Figure 3:
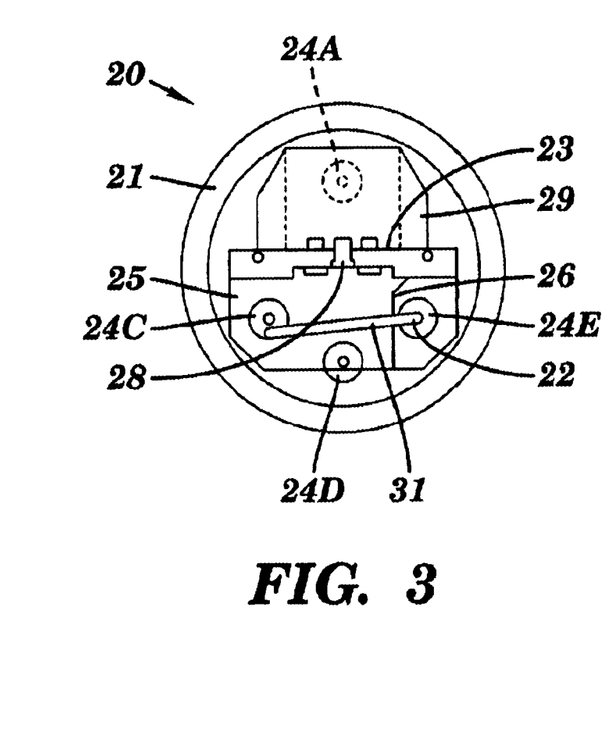
FIG. 3 is a top plan view of the improved lamp shown in FIG. 1.

Cathode 22 includes a thermionic coil which is connected to one of pins 24. In FIGS. 1–3, an overhead conductor 31 is shown as connecting cathode 22 with one of the other leads. This conductor does not appear in FIGS. 4–16.

Figure 5:
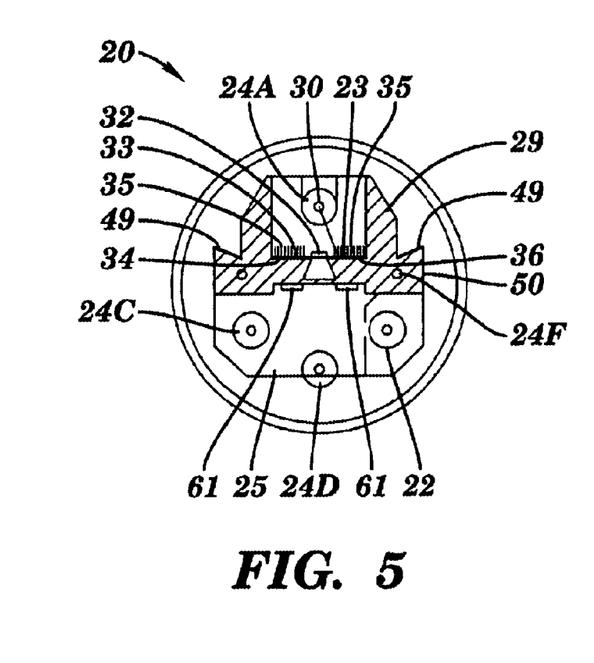
FIG. 5 is an enlarged fragmentary horizontal sectional view thereof, taken generally on line 5—5 of FIG. 1.

The anode 23 is shown as being a rectangular vertical plate-like member having a pair of vertically-spaced holes. As best shown in FIG. 5, these holes are physically located above and below the central portion of the focusing electrode, and are designed to receive and accommodate passage of the shank portions of a pair of fasteners, one of which is indicated at 32. These fasteners may be rivets, bolts, or the like. Suffice it to say here that the shank portions of such fasteners pass through openings provided in ceramic mounting support 29, and through the anode holes. The distal ends of the fasteners are suitably turned or deformed so as to securely hold the anode to the rear surface of the ceramic mounting support. The anode has a rearwardly-facing planar vertical surface 33, and a forwardly-facing planar vertical surface 34 adapted to bear against the rearwardly-facing planar vertical surface 36 of the ceramic mounting support 29.

Figure 6:
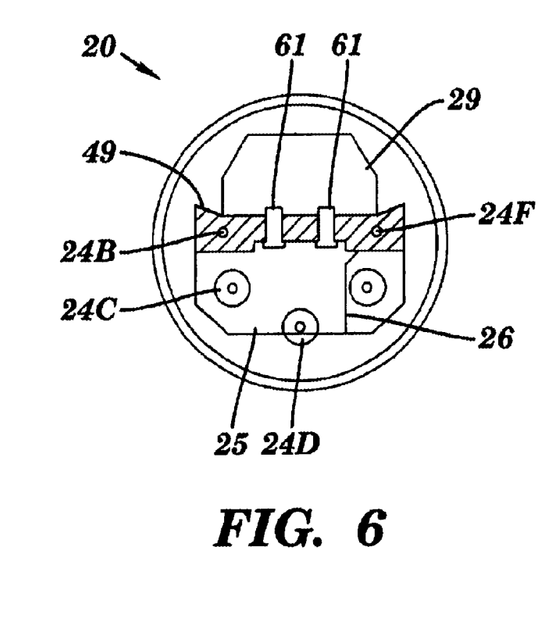
FIG. 6 is an enlarged fragmentary horizontal sectional view thereof, taken generally on line 6—6 of FIG. 1.
Figure 7:
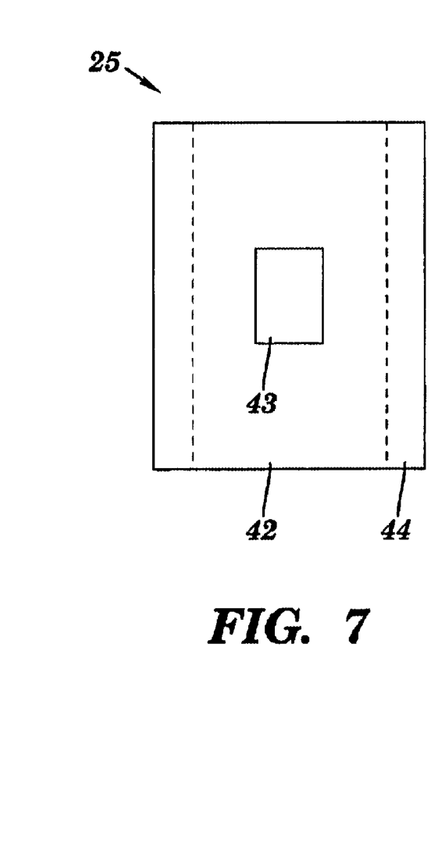
FIG. 7 is a front elevation of the window-shielding electrode.
Figure 8:
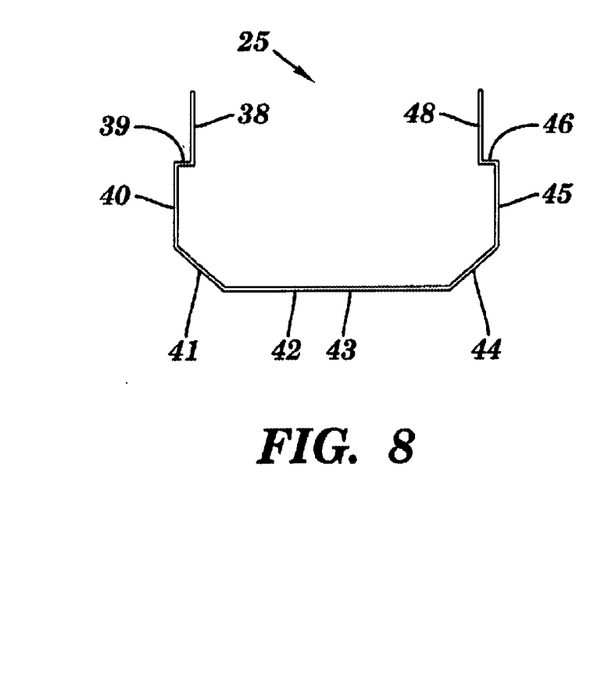
FIG. 8 is a top plan view of the window-shielding electrode shown in FIG. 7.
Figure 9:
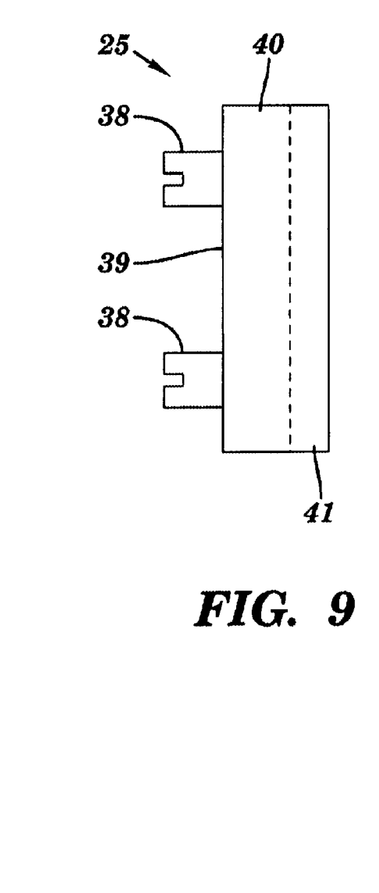
FIG. 9 is a left side elevation of the window-shielding electrode shown in FIG. 7.

As best shown in FIGS. 7–9, the window-shielding electrode 25 is depicted as being a vertically-elongated specially-configured articulated or bent plate-like member that sequentially includes leftward vertically-spaced rearwardly-extending tab portions 38, a leftwardly-extending lateral portion 39, a forwardly-extending portion 40, a forwardly-and-rightwardly-inclined portion 41, a transversely-extending planar front portion 42 provided with a rectangular through-opening 43, a rightwardly-and-rearwardly-extending inclined portion 44, a rearwardly-extending portion 45, a leftwardly-extending portion 46, and rightward rearwardly-extending vertically-spaced tab portions 48. Surfaces 48, 46, 45, 44 are generally mirror images of surfaces 38, 39, 40 and 41, respectively. As best shown in FIG. 8, tab portions 38, 38, and 48, 48 extend rearwardly from surfaces 39, 46, respectively, and are designed and intended to be passed through cooperatively-configured slots, severally indicated at 70 (FIGS. 15–16), provided in the ceramic support. Thereafter, the exposed distal ends of these tabs are adapted to be struck over or otherwise deformed, as severally indicated at 49 in FIGS. 4–6, to securely hold the window-shielding electrode to the ceramic support.

Figure 4:
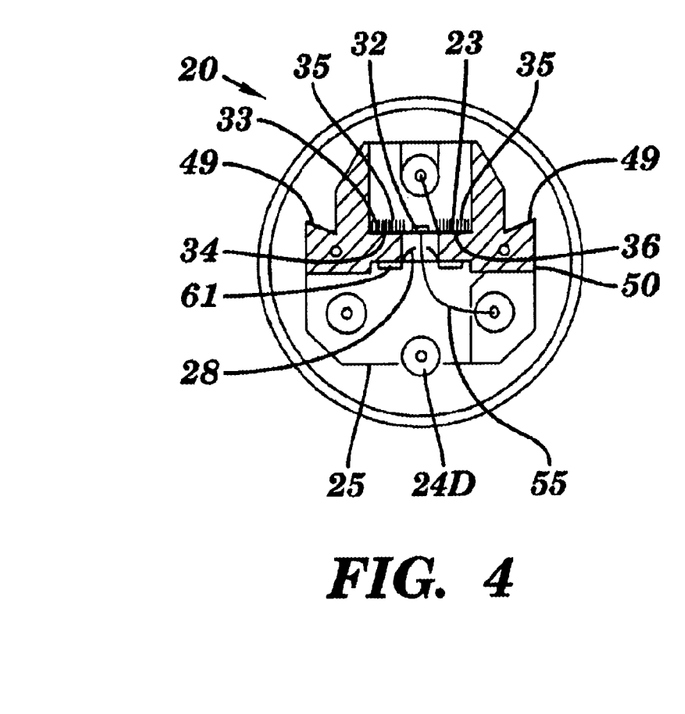
FIG. 4 is an enlarged fragmentary horizontal sectional view thereof, taken generally on line 4—4 of FIG. 1, showing a portion of the mechanical structure supported on the uppermost distal ends of the leads, and showing the anode as being rearwardly exposed but peripherally surrounded by a ceramic shield.
Figure 10:
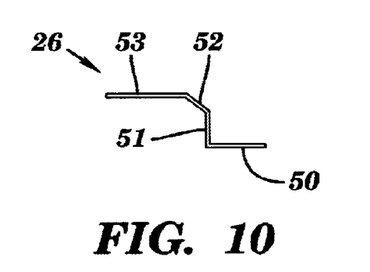
FIG. 10 is a top plan view of the cathode-shielding electrode.
Figure 11:
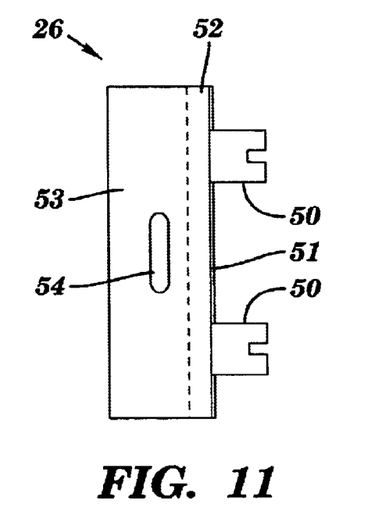
FIG. 11 is a side elevation of the cathode-shielding electrode shown in FIG. 10.
Figure 15:
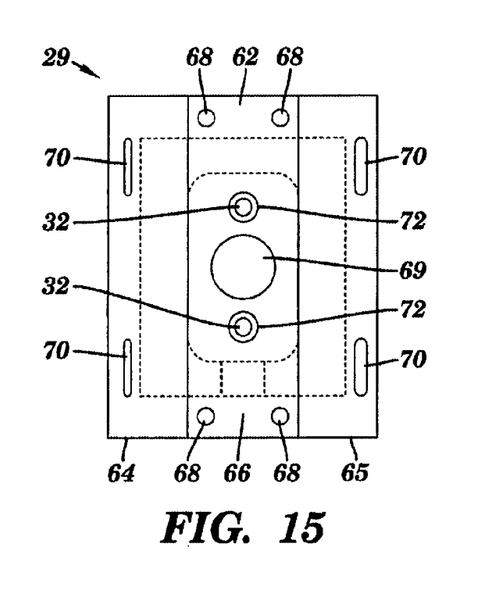
FIG. 15 is a front elevation of the ceramic support shown in FIG. 14.
Figure 16:
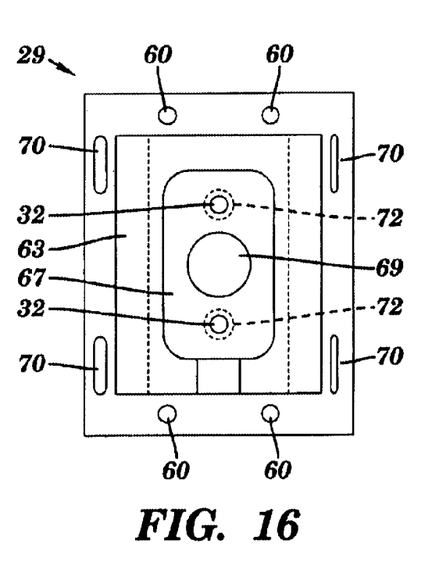
FIG. 16 is a rear elevation of the ceramic support shown in FIG. 14.

Referring now to FIGS. 3–6, 10–11 and 15–16, the cathode-shielding electrode 26 is also shown as being a vertically-elongated specially-configured articulated or bent sheet-like member that sequentially includes rearwardmost vertically-spaced tab portions 50, 50, a transversely-extending portion 51, a leftwardly-and-forwardly-extending planar portion 52, and a portion 53 continuing forwardly therefrom. Shield surface 53 is provided with a central slot-like opening 54 that is provided to accommodate passage of a stream of electrodes from the cathode to the anode along path 55 (FIG. 4). As best shown in FIGS. 3–4 and 10, the forwardmost edge of cathode-shielding electrode portion 53 is positioned adjacent window-shielding electrode portion 42. As shown in FIGS. 11 and 15–16, two rearwardly-extending tabs 50, 50 are passed through the slots 70 provided through the ceramic support, and are bent over or otherwise deformed (FIGS. 4–6), to securely lock and hold the shield 26 to the ceramic support.

Figure 12:
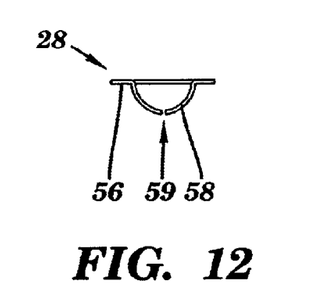
FIG. 12 is a top plan view of the focusing electrode.
Figure 13:
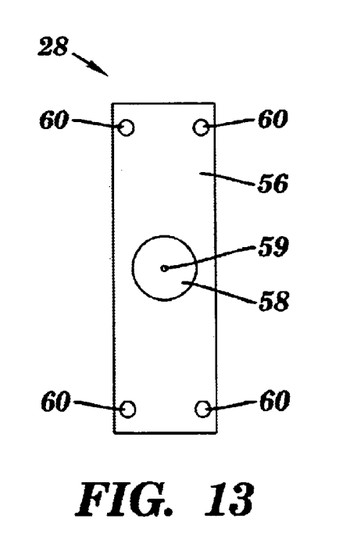
FIG. 13 is a front elevation of the focusing electrode shown in FIG. 12.

As best shown in FIGS. 12–13, the focusing electrode 28 is generally configured as a vertically-elongated plate-like member 56 and having a spherical dimple-shaped central portion 58 struck rearwardly therein. Thus, this dimple-shaped portion has a forwardly-facing spherical concave surface and a rearwardly-facing spherical convex surface. The dimple-shaped portion is provided with a central horizontal through-hole 59 that is aligned with the anode. As best-shown in FIG. 13, the plate-like portion is provided with four rectangularly-spaced mounting holes, severally indicated at 60, to receive and accommodate passage of a like number of fasteners, severally indicated at 61 in FIG. 6. These fasteners may be rivets, screws, or the like. Suffice it to say here that fasteners 61 are used to securely hold the focusing electrode to the forward central surface of the ceramic support 29.

Figure 14:
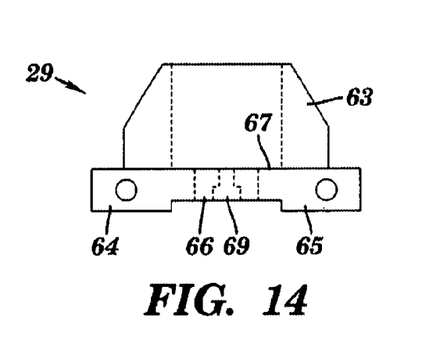
FIG. 14 is a top plan view of the ceramic support.

Referring now to FIGS. 14–16, the ceramic support 29 is depicted as being a specially-configured integrally-formed dielectric member, which may be formed of alumina ($Al_2O_3$) or the like. The support is shown as having a forward plate-like portion 62, and a rearwardmost flange portion 63. The forward portion 62 is shown as having forwardly-facing left and right planar vertical surface 64, 65, and a forwardly-facing central slightly-recessed surface 66. The forward portion has four holes, severally indicated at 68, that are adapted to be aligned with the four mounting holes 60 in the focusing electrode, and are further designed to accommodate passage of the shank portions of fasteners 61 (FIG. 6). The plate-like forward portion 62 is also depicted as having a rearwardly-facing planar vertical surface 67 (FIG. 16). Referring to FIG. 14, fastener holes 72 for receiving fasteners 32 are shown. Again, the fasteners 32 may be rivets, bolts or the like.

The forwardly-facing surface of the anode is adapted to bear against ceramic support surface 67. In the preferred embodiment, the anode is held in this position by means of fasteners 32, 32 (FIG. 5). The ceramic flange portion 63 extends rearwardly from plate-like forward portion 62, and peripherally surrounds the anode. In effect, the anode is recessed within the flange portion, but is exposed rearwardly to facilitate the radiation of heat therefrom. The principal purpose of flange portion 63 is to shield the anode from arcing about the front plate-like portion, and to assure that the electrons flow in the direction of stream 55 (FIG. 4) from the cathode to the anode. The plate-like portion 62 is shown as having a through-hole 69 to receive and accommodate the spherical dimple in focusing electrode 28, and allow for passage of electrons from the cathode through the focusing electrode to the anode plate. As best shown in FIGS. 15 and 16, the ceramic support flange portion has four vertically-elongated slots, severally indicated at 70, to receive an accommodate passage of the rearwardly-extending tabs on the window-shielding and cathode-shielding electrodes.

The improved device is assembled as generally shown in FIG. 4. More particularly, the rearwardly-extending tabs on the cathode-shielding and window-shielding electrodes are passed through support slots 70, and the distal ends thereof are bent over, as shown in FIGS. 4–6, to securely hold them in this position. The anode plate is secured to the rear of the ceramic support, in the recess provided within flange portion 63, and is held in this position by means of vertically-spaced fasteners 32, 32. The focusing electrode is operatively mounted on the central recessed surface 66 of the ceramic shield, and may be held in this position by means of the four fasteners indicated at 61. The structure is placed within a tube, and is substantially filled only with deuterium gas. When the lamp is energized, electrons issue from the cathode 22 and travel along path 55 (FIG. 4) through focusing electrode hole 59 to the anode. It, should be noted in the arrangement shown in FIG. 4, that the anode is rearwardly exposed in that there is substantially no heat transfer-impeding material to the rear of it. Hence, in operation, heat from the anode may radiate rearwardly and be discharged from the lamp.

If desired, a fin assembly or another surface area-increasing undulating member may be operatively secured to the rear of the anode to increase the thermal radiation surface.

Thus, the improved lamp is particularly designed and configured so as to facilitate thermal radiation rearwardly from the anode. This feature immediately distinguishes the improved lamp from prior art lamps, which provide a radiation-impeding mass to the immediate rear of the anode. Indeed, some prior art devices sandwich the anode between other supports. Hence, heat from the anode must travel first by conduction through the radiation-impeding mass, before it can be dissipated.

Figure 17:
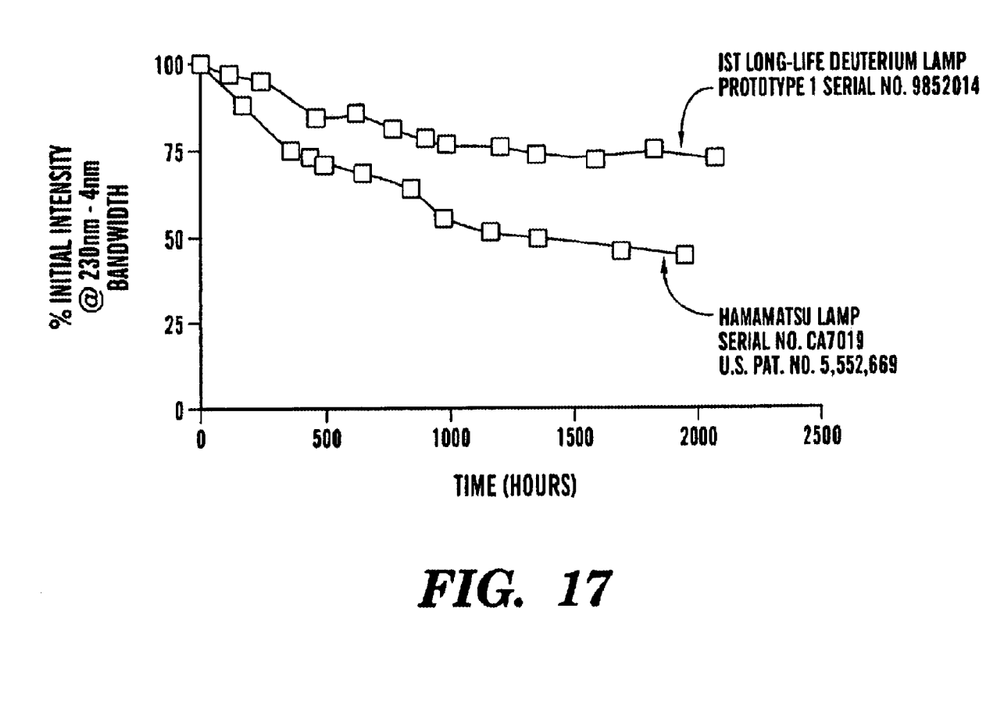
FIG. 17 is a representative plot of percent of initial intensity (ordinate) vs. elapsed time (abscissa), showing a prototype of the improved lamp as having markedly improved life over a Hamamatsu lamp, Serial No. CA7019, that appears to be manufactured in accordance with the teaching of U.S. Pat. No. 5,552,669.

The improved lamp has been found to offer increased life over those afforded by prior art lamps, such as those designed in accordance with the teachings of U.S. Pat. No. 5,552,669. FIG. 17 is a representative plot of percent initial intensity (ordinate) at 230 nanometers (4 nanometer bandwidth) vs. time (abscissa) expressed in hours. In this regard, the ordinate expresses the percentage diminution in the initial intensity. Otherwise stated, when the lamp is initially put into service at t=0 hours, the lamp will have an initial intensity. Thereafter, the intensity of the lamp is expressed as a percentage of its initial intensity. The data plotted in FIG. 17 illustrates the life of the improved lamp versus the life of a prior art lamp that appears to have been manufactured in accordance with the teachings of U.S. Pat. No. 5,552,669. It should be noted that the intensity of the improved lamp herein is consistently higher then the intensity of the prior art lamp, and that the disparity therebetween appears to generally increase with passage of time. Thus, at t=500 hours, the improved lamp has the intensity of approximately 80–85% of its original intensity, whereas the prior art lamp is about 70% of its original intensity. At t=1,000 hours, the improved lamp has an intensity of about 80% of its original value, whereas the intensity of the prior art lamp as been reduced to about 55% of its original value. At t=1,500 hours, the intensity of the improved lamp is about 70% of its original value, whereas the intensity of the prior art lamp has been reduced to about 50% of its original value. At t=2,000 hours, the intensity of the improved lamp is still about 70–75% of its original intensity, whereas the prior art lamp actually failed at about t=1,800 hours.

The above-described data is generally the output of a product life test. In this case, both the prior art lamp and the improved lamp were tested in separate instruments operated under identical conditions. The instruments used for this test were Waters 2487 UV Absorbence Detectors, used in the field of liquid chromatography. Although lamps were operated in two separate instruments, the intensity measurements were obtained by a separate third instrument, ensuring that the data was not influenced by and differences between the instruments, and to eliminate, as much as possible, instrument degradation that may occur over time. This is a common method of testing the life of deuterium lamps.

Therefore, the improved lamp offers the principal advantage of longer life than prior art lamps. It is believed that the longer life of the improved lamp is attributable to its improved heat dissipation characteristics, as compared with those of the prior art lamps.

MODIFICATIONS

Of course, the present invention contemplates that many changes and modifications may be made. For example, the shape and structure of the window-shielding and cathode-shielding electrodes may be readily changed or modified. The ceramic support may be formed of alumina or some other dielectric material. The flange and plate portions thereof may be formed separately or integrally. The various electrodes may be formed of nickel or the like. The anode may be attached differently to the rear of the ceramic support, as may be the focusing electrode. If desired, other devices may be mounted on the rear of the mechanism to improve the heat radiation properties thereof.

Therefore, while a preferred embodiment of the improved lamp has been shown and described, and several modifications thereof discussed, persons skilled in this art will readily appreciate that various additional changes and modifications may be made without departing from the spirit of the invention, as defined and differentiated by the following claims.

What is claimed is:

1. A lamp comprising:
   an envelope filled with a fluid;
   a cathode arranged within the envelope;
   an anode arranged within the envelope, the anode having at least first and second surfaces;
   at least one electrical lead coupled to each of the anode and the cathode and extending from the envelope; and
   an anode support structure connected to the first surface of the anode, wherein at least a portion of the first surface of the anode is exposed to the cathode and all of the second surface of the anode is exposed and faces away from the cathode.

2. The apparatus as set forth in claim 1 further comprising one or more connectors in the anode support structure, the connectors securing the anode to the anode support structure.

3. The apparatus as set forth in claim 2 wherein each of the connectors comprises a hole that receives a corresponding fastener to secure the anode to the anode support structure.

4. The apparatus as set forth in claim 3 wherein the hole further comprises a threaded hole.

5. The apparatus as set forth in claim 3 wherein the corresponding fastener comprises at least one of a threaded bolt, a threaded screw and a rivet.

6. The apparatus as set forth in claim 1 further comprising a shield arranged within the envelope, the shield substantially surrounding the first surface of the anode.

7. The apparatus as set forth in claim 1 wherein the fluid comprises deuterium gas.

8. The apparatus as set forth in claim 1 wherein the envelope is made of a material that enables thermal energy to radiate from the envelope.

9. The apparatus as set forth in claim 1 wherein the second surface of the anode comprises one or more undulating shaped structures, wherein all of the undulating structures are exposed and face away from the cathode.

10. The apparatus as set forth in claim 9 wherein the one or more undulating shaped structures comprise fin structures.

11. The apparatus as set forth in claim 1 further comprising a baffle connected to the anode.

12. The apparatus as set forth in claim 1 wherein the anode support structure is made of a ceramic material.

13. A heat dissipation apparatus for lamps having an envelope filled with a fluid and comprising a cathode and an anode arranged within the envelope, the apparatus comprising: an anode support structure connected to a first surface of the anode, wherein at least a portion of the first surface of the anode is exposed to the cathode and all of a second surface of the anode is exposed and faces away from the cathode.

14. The apparatus as set forth in claim 13 further comprising one or more connectors in the anode support structure, the connectors securing the anode to the anode support structure.

15. The apparatus as set forth in claim 14 wherein each of the connectors comprises a hole that receives a corresponding fastener to secure the anode to the anode support structure.

16. The apparatus as set forth in claim 15 wherein the hole further comprises a threaded hole.

17. The apparatus as set forth in claim 15 wherein the corresponding fastener comprises at least one of a threaded bolt, a threaded screw and a rivet.

18. The apparatus as set forth in claim 13 wherein the anode support structure is made of a ceramic material.

19. The apparatus as set forth in claim 1 wherein the anode support structure further comprises a flange portion that peripherally surrounds a third surface of the anode.

20. The apparatus as set forth in claim 13 further comprising a flange portion that peripherally surrounds a third surface of the anode.

* * * * *